US012807224B2

(12) United States Patent
Liu et al.

(10) Patent No.: US 12,807,224 B2
(45) Date of Patent: Nov. 24, 2026

(54) METHODS FOR TRAILER BACK-UP ASSIST UTILIZING STEER-BY-WIRE

(71) Applicant: Volvo Car Corporation, Gothenburg (SE)

(72) Inventors: Chang Liu, Shanghai (CN); Jakob Magnus Agne Roempke, Täby (SE); Matthijs Klomp, Ljungskile (SE)

(73) Assignee: Volvo Car Corporation, Gothenburg (SE)

( * ) Notice: Subject to any disclaimer, the term of this patent is extended or adjusted under 35 U.S.C. 154(b) by 8 days.

(21) Appl. No.: 18/999,065

(22) Filed: Dec. 23, 2024

(65) Prior Publication Data

US 2025/0368261 A1 Dec. 4, 2025

Related U.S. Application Data

(60) Provisional application No. 63/652,379, filed on May 28, 2024.

(51) Int. Cl.
*B62D 13/06* (2006.01)
*B62D 15/02* (2006.01)

(52) U.S. Cl.
CPC ........... *B62D 13/06* (2013.01); *B62D 15/027* (2013.01)

(58) Field of Classification Search
CPC ....... B62D 13/06; B62D 15/027; B62D 13/00
See application file for complete search history.

(56) References Cited

U.S. PATENT DOCUMENTS

| | | | | |
|---|---|---|---|---|
| 9,937,953 B2 * | 4/2018 | Lavoie | B60D 1/62 | |
| 2005/0206224 A1 * | 9/2005 | Lu | B60T 8/246 | 303/7 |
| 2005/0236894 A1 * | 10/2005 | Lu | B62D 11/08 | 303/139 |
| 2005/0236896 A1 * | 10/2005 | Offerle | B62D 9/002 | 303/146 |
| 2006/0103511 A1 * | 5/2006 | Lee | B62D 5/008 | 340/431 |
| 2016/0039456 A1 * | 2/2016 | Lavoie | B62D 15/027 | 701/41 |

(Continued)

FOREIGN PATENT DOCUMENTS

DE 102005028326 A1 12/2006

OTHER PUBLICATIONS

Hafner et al., "Control for Automated Trailer Backup", WCX™ SAE Technical Paper, 2017-01-0040, 2017, 7 pages.

(Continued)

*Primary Examiner* — Long T Tran
(74) *Attorney, Agent, or Firm* — Amin, Turocy & Watson, LLP

(57) ABSTRACT

A vehicle maneuvering system, comprising a processor; and a memory communicatively coupled to the processor, the memory having stored therein computer-executable instructions, comprising a steer-by-wire component configured to receive steering wheel input and navigate the vehicle in reverse mode, also a hitch angle component that estimates hitch angle of a trailer coupled to the vehicle, and estimate an angular rate of the hitch angle through the data gathered from the hitch angle component and a controller that controls speed of the vehicle and steering wheel angle input to maintain the hitch angle within a stable range.

24 Claims, 12 Drawing Sheets

(56) References Cited

U.S. PATENT DOCUMENTS

| | | | | |
|---|---|---|---|---|
| 2020/0148256 | A1 | 5/2020 | Brimmer | |
| 2021/0380109 | A1* | 12/2021 | Pourrezaei Khaligh | B62D 15/0285 |
| 2022/0219604 | A1* | 7/2022 | Ma | B60K 35/10 |
| 2022/0366189 | A1* | 11/2022 | Oreifej | G06F 18/2148 |
| 2022/0410872 | A1* | 12/2022 | Salter | B60L 3/0015 |
| 2024/0116437 | A1* | 4/2024 | Khan | B60Q 9/008 |
| 2024/0239409 | A1* | 7/2024 | Tokoro | B62D 6/002 |

OTHER PUBLICATIONS

Liu et al., "Trailer Reversing Supported by Steer-by-Wire", AVEC, LNME, 2024, pp. 585-596.

Werling et al., "Reversing the General One-Trailer-System: Asymptotic Curvature Stabilization and Path Tracking", IEEE Transactions on Intelligent Transportation Systems, vol. 15, No. 2, 2014, pp. 627-636.

Xu et al., "Yaw Rate Based Trailer Hitch Angle Estimation for Trailer Backup Assist", SAE Technical Paper 2017-01-0027, Mar. 28, 2017, 7 pages.

Mortazavizadeh et al., "Recent Developments in the Vehicle Steer-by-wire System", IEEE Transactions on Transportation Electrification, vol. 6, No. 3, Jun. 25, 2020, pp. 1226-1235.

Belco Trailers, "How to Reverse a Trailer", Online available at URL: https://belcocustomtrailers.com.au/trailer-tips/how-to-reverse-a-trailer/#:~:text=Keep%20the%20steering%20wheel%20straight,and%20less%20in%20the%20other, Aug. 17, 2022, 10 pages.

Enqvist, Olof, "AFS-assisted Trailer Reversing", Department of Electrical Engineering, Jan. 27, 2006, 57 pages.

Nilsson et al., "Trailer Parking Assist(tpa)", Master of Science Thesis in the Master Degree Programme, System, Control and Mechatronics, 2013, 36 pages.

IPG Automotive, ""CarMaker"", Online available at URL: https://www.ipg-automotive.com/en/products-solutions/software/carmaker/, retreived on Mar. 22, 2025, 8 pages.

"SP1 Compact String Pot • Voltage Divider Output", Celesco, Online available at URL: http://www. celesco-transducers.com/pdf/SP1.pdf, 2013.

Zhao, Jingdong, "A Review of Wearable IMU (inertial-measurement-unit)-based Pose Estimation and Drift Reduction Technologies", Journal of Physics: Conference Series, vol. 1087, No. 042003, 2018, 8 pages.

Elhassan, Amro, "Autonomous Driving System for Reversing an Articulated Vehicle", Degree Project, In Automatic Control , Second Level, 2015, 90 pages.

Johannesson et al., "Investigation of Steering Feedback Control Strategies for Steer-by-Wire Concept", Master of Science Thesis in Electrical Engineering Department of Electrical Engineering, 2018, 64 pages.

Caup et al., "Video-based Trailer Detection and Articulation Estimation", Intelligent Vehicles Symposium, Jun. 2013, 7 pages.

Dahal et al., "Deeptrailerassist: Deep Learning Based Trailer Detection, Tracking and Articulation Angle Estimation on Automotive Rear-view Camera", CVF International Conference on Computer Vision (ICCV) Workshops, Oct. 2019, 9 pages.

Xu et al., "Accurate and Robust Line Segment Extraction Using Minimum Entropy with Hough Transform", IEEE Transactions on Image Processing, vol. 24, No. 3, Mar. 2015, pp. 813-822.

Chang et al., "Automotive Augmented Reality: User Experience and Enabling Technology", Information Display, vol. 38, No. 1, Jan./Feb. 2022, pp. 12-18.

Mathworks, "Simulink—Simulation Model-Based Design—MATLAB", Online available at URL: https://www.mathworks.com/products/simulink.html, retrieved on Mar. 23, 2025, 10 pages.

* cited by examiner

METHODS FOR TRAILER BACK-UP ASSIST UTILIZING STEER-BY-WIRE

CROSS REFERENCE TO RELATED APPLICATION

This application claims the benefit of U.S. Provisional Patent Application No. 63/652,379 filed May 28, 2024, and entitled "METHODS FOR TRAILER BACK-UP ASSIST UTILIZING STEER-BY-WIRE," which is incorporated by reference herein in its entirety.

TECHNICAL FIELD

Embodiments disclosed and claimed herein relate to utilizing a steer-by-wire system in conjunction with a closed loop-trailer reversal control system to enable a trailer back-up assist system.

BACKGROUND

Reversing a trailer using a vehicle is an unstable process which can be challenging even for experienced drivers. The main challenge being the non-minimum-phase property of vehicle-trailer kinematics resulting from off-axle interconnections. A small disturbance or an error can cause a big offset on the trailer direction, making it less intuitive for drivers to correct and maintain the trailer direction.

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments described herein, systems, computer-implemented methods, apparatus and/or computer program products are presented that facilitate remotely controlling vehicle functions and applications accessed by a remote auxiliary device that employs a private digital key to maintain privacy and consent management.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory.

In various embodiments, the computer-executable components can comprise a steer-by-wire component configured to receive steering wheel input and navigate the vehicle in reverse mode; also a hitch angle component that estimates a hitch angle of a trailer coupled to the vehicle, and estimates angular rate of the hitch through the data gathered from the hitch angle component; and a controller that controls speed of the vehicle and steering wheel angle input to maintain the hitch angle within a stable range. Another embodiment may further comprise an artificial intelligence component that has been implicitly trained to facilitate the controller maintaining the hitch angle within the stable range along with further an artificial intelligence component that has been explicitly trained to facilitate the controller maintaining the hitch angle within the stable range.

One or more additional embodiments are directed to a computer program product that facilitates the movement of the trailer, the computer program product comprising readable storage medium having program instructions embodied therewith. The program instructions can be executable by a processor to cause the processor to configure a steer-by-wire component to receive steering wheel input and navigate the vehicle in reverse mode.

Also in another embodiment, the program instructions can be executable by a processor to cause the processor to estimate a hitch angle of a trailer coupled to the vehicle, and estimate an angular rate of the hitch angle through the data gathered from the hitch angle component; and to cause the processor to control the speed of the vehicle and steering wheel angle input to maintain the hitch angle within a stable range.

Another embodiment may further cause the processor to use artificial intelligence that has been implicitly trained to facilitate the controller maintaining the hitch angle within the stable range along with the processor to use artificial intelligence that has been explicitly trained to facilitate the controller maintaining the hitch angle within the stable range.

In some embodiments, elements described in connection with the disclosed systems can be embodied in different forms such as a computer-implemented method, a computer program product, or another form.

Figure 1:
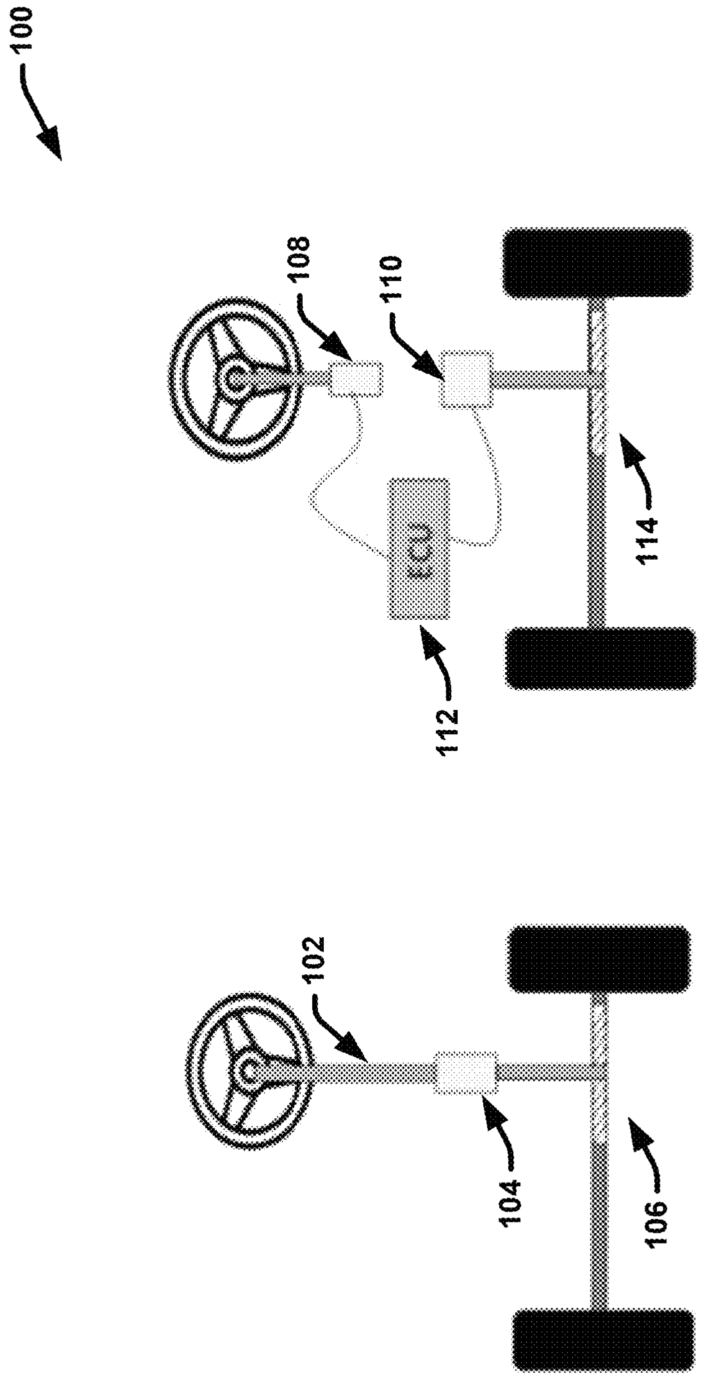
FIG. 1 illustrates a diagram of an example, non-limiting system that depicts a mechanical connection between the steering wheels and the road wheels and also depicts replacing this mechanical connection with an electrical connection in accordance with one or more embodiments described herein.

Appendix A is a paper that discloses various embodiments, and forms part of this specification.

DETAILED DESCRIPTION

The following detailed description is merely illustrative and is not intended to limit, claims, embodiments and/or application or uses of embodiments. Furthermore, there is no intention to be bound by any expressed or implied information presented in the preceding Summary section or in the Detailed Description section.

One or more embodiments described herein is directed to utilizing a steer-by-wire system in conjunction with a closed loop-trailer reversal control system to create a trailer back-up assist system. A trailer that is pulled behind a vehicle, commonly referred to as a towable trailer, is a non-motorized vehicle designed to be attached to and towed by a powered vehicle, such as a car, truck, or other vehicle. Trailers are used for a wide range of purposes, from recreational activities like camping to commercial uses such as transporting goods, equipment, and livestock. They offer flexibility and additional cargo capacity for vehicles, making them essential tools for both personal and professional use. Backing up a trailer can be a daunting task, even for experienced drivers. The main challenge being the non-minimum-phase property of vehicle-trailer kinematics resulting from off-axle interconnections.

Reversing a trailer using a vehicle is an unstable process. A small disturbance or an error can cause a big offset on the trailer direction, making it less intuitive for drivers to correct and maintain the trailer direction. The trailer back-up assist system described herein finds a way for drivers to control the direction of the trailer using a steer-by-wire system, where the steering wheel input directly controls the trailer-vehicle hitch angle instead of the rack position. The system shows robustness dealing with disturbances.

There are many benefits with the introduction of steer-by-wire into vehicles. There are both economic and functional reasons for this introduction, examples of economic reasons are such as fewer modifications for left- or right-hand drive vehicles, simpler axle geometry and weight and space reductions. The main functional reason for steer-by-wire is the possibility of having a steering ratio that changes with speed, surface, etc. Other functions can also be implemented with steer-by-wire, such as assisting the driver while driving in strong wind. In this case, the steer-by-wire will be used to assist the driver in reversing with a trailer.

Reversing with a trailer is known to be a difficult maneuver and a lot of experience is needed in order to be able to do so in a good and accurate way. The main problem lies in that the system is unstable, if you go straight back with the vehicle and trailer system, sooner or later the trailer will stop going straight back and will end up hitting the vehicle. It is also difficult since the direction that the trailer will go, will always be opposite to the direction the vehicle will go because they are linked with a ball joint.

The trailer back-up assist system described herein is different when compared to a traditional "non-steer-by wire" vehicle since it takes the input from the driver of what the desired vehicle-trailer angle should be instead of what the wheel angle should be. While this maneuver could also be achieved in a traditional vehicle without steer-by-wire, there are drawbacks.

In traditional "non-steer-by wire" systems, the steering wheel is mechanically connected with the steering rack. Because of this, controlling the trailer direction using the steering wheel is unrealistic as it would require an extra system, other than the steering wheel, in order to bypass the steering wheel for inputting the desired command to the steering rack. In a steer-by-wire system, the mapping between the steering wheel and the steering rack is programmable, which makes it possible to use the steering wheel as a controller for the vehicle-trailer hitch angle, while the steering rack outputs the required steering angle on the front wheels of the vehicle without mechanical constrictions. This reduces the parts needed for the structure and also reduces the possibility of malfunctions.

The primary challenge lies in the difficulty for the driver to translate their desired trailer movements through the steering wheel, which is mechanically linked to the wheels. Consequently, the steering wheel must constantly mirror the wheel angles, necessitating the use of alternative mechanisms, such as a knob, for the driver to specify the desired vehicle-trailer angle e.g., the $\phi$ angle. This setup results in the steering wheel rotating during maneuvers, sometimes at high speeds, causing discomfort for the driver and potentially posing safety risks.

Turning to FIG. 1, depicted is a traditional "non-steer-by wire" system 100 where there is a mechanical connection between steering wheels and road wheels. At a high level this mechanical connection consists of a steering column 102, steering gear 104, and rack and pinion 106. In contrast, a steer-by wire system as depicted replaces the mechanical connection with an electrical connection. This system consists of a driver feedback motor 108 which connects to Electric Control Unit (ECU) 112. The ECU is a computer that receives signals from the steering wheel and relays the signals to the steering rack. The ECU is additionally interfaced with Electric Power-Assisted Steering (EPAS) 110. In this embodiment the EPAS is a type of electric steering that employs an electric motor to assist a driver in turning the wheel. EPAS can help drivers maintain control when steering on uneven or twisting roads. It's become standard equipment in most new cars and trucks, replacing conventional hydraulic power steering systems. EPAS systems can include features like adjustable power assist, pre-wiring for easy installation, and a potentiometer to control the amount of assistance provided. The EPAS is then interfaced to the rack and pinion 114.

An aspect of embodiments described herein is to develop and implement a system that is used for helping the driver reverse with a trailer. With that, it is also required to understand what sensor data can be utilized, this could include computer vision.

Vehicle simulation tools such as IPG CarMaker and Matlab Simulink can be used in initial stages, while in later stages a real vehicle and trailer will be used. Experiments can be conducted to evaluate how much better performance of such a trailer back-up assist system would be compared to normal driving for both drivers with and without experience reversing with a trailer, this can be done in both simulations and in the real vehicle system.

A kinematic model can be used in this innovation. This model which will be used in the vehicle to make it possible to control the angle or angular rate between the trailer and the vehicle can be based on a geometric analysis. The model can be based on a bicycle model of a vehicle connected to a trailer.

Figure 2:
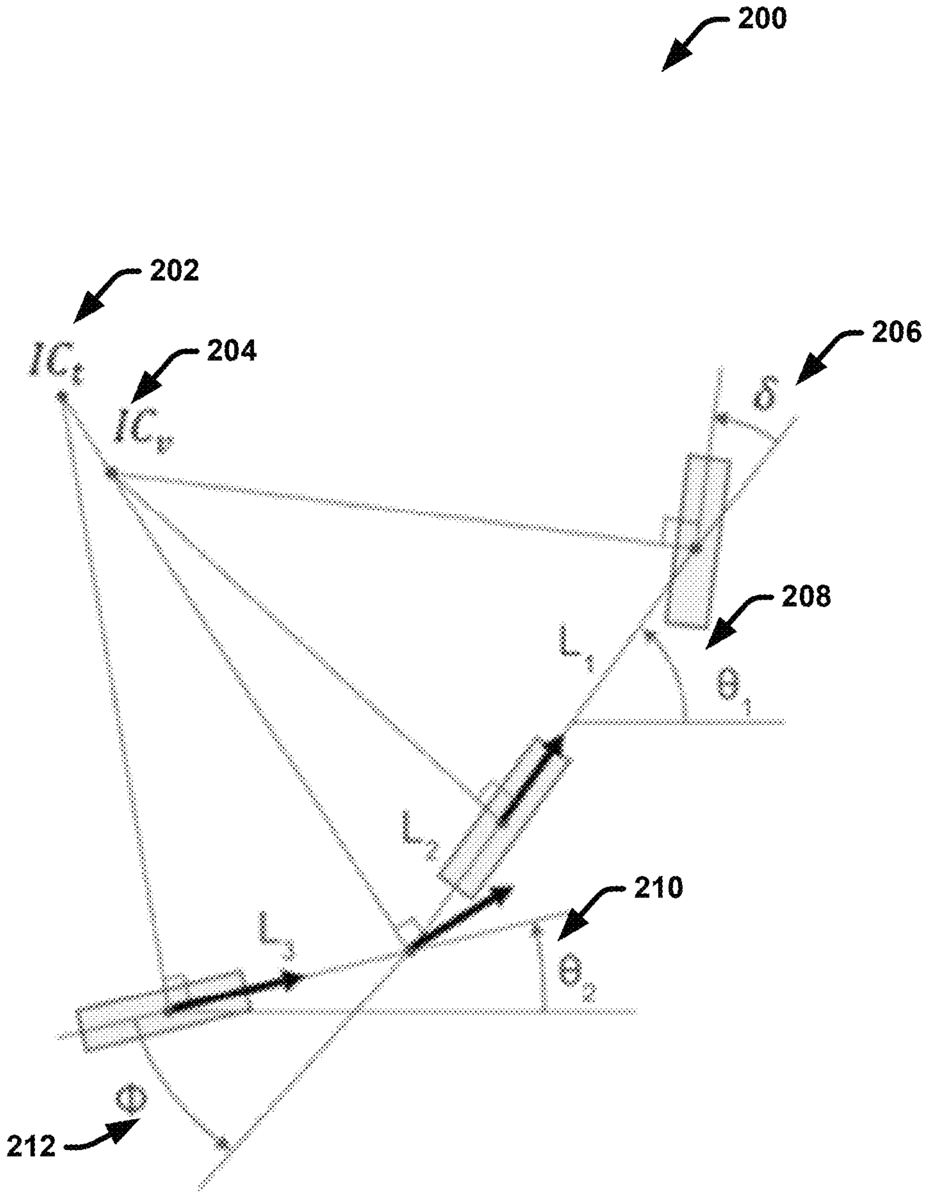
FIG. 2 illustrates a diagram of an example, non-limiting kinematic model based on a bicycle model for the vehicle based on geometry in accordance with one or more embodiments described herein.

In FIG. 2 diagram 200 is observed, in this kinematic model there are both fixed variables such as the wheelbase (L1), length from the tow hook to the rear axle of the vehicle (L2) as well as the length from tow hook to the axle on the trailer (L3). Additionally, there are values that will change with time such as, actual and demanded vehicle-trailer angle $\phi$ 212, the actual and demanded angular rate $\dot{\phi}$ as well as the speed of the vehicle.

The angle between the vehicle and trailer $\phi$ 212 is defined as seen in Equation 1 where $\theta_1$ 208 and $\theta_2$ 210 are the vehicle and trailer global angle respectively. This can be observed in FIG. 2.

$$\phi = \theta_2 - \theta_1 \tag{1}$$

The angular rate of the angle $\phi$ 212 is defined in Equation 2 as $$\dot{\phi} = \dot{\theta}_2 - \dot{\theta}_1 \tag{2}$$

The points $IC_t$ 202 and $IC_v$ 204 are the trailer's and vehicle's rotational centers respectively. These are defined as the points around which the bodies rotate.

Based on the bicycle model in FIG. 2, equations can be derived on how the angular rate of the angle between the vehicle and trailer ($\dot{\phi}$) depends on the speed of the vehicle (v), the angle between the vehicle and trailer ($\phi$) 212, and the steering angle ($\delta$) 206. This can be seen in equation 3.

$$\dot{\phi} = \frac{v \cdot \sin(-\phi)}{L_3} - \frac{v}{L_1} \cdot \left(1 + \frac{L_2 \cdot \cos(-\phi)}{L_3}\right) \cdot \tan(\delta) \tag{3}$$

Equation 3 is non-linear. The non-linearity is a problem for stability and robustness if it is to be controlled. This means that a linearization of the equation has to be done. There are multiple ways to linearize this system but a simple and effective method of doing it is to use a first-order Taylor expansion. This is a local linearization and the linearization will be done around zero for $\phi$ 212.

The first-order Taylor expansion gives the following equation:

$$\dot{\phi} = -\frac{v}{L_3} \cdot \phi - \frac{v}{L_1} \cdot \left(1 + \frac{L_2}{L_3}\right) \cdot \delta \tag{4}$$

If the equation is derived for $\delta$ (206), it gives:

$$\delta = \frac{\dot{\phi} + \frac{v}{L_3} \cdot \phi}{-\frac{v}{L_1} \cdot \left(1 + \frac{L_2}{L_3}\right)} \tag{5}$$

Figure 3:
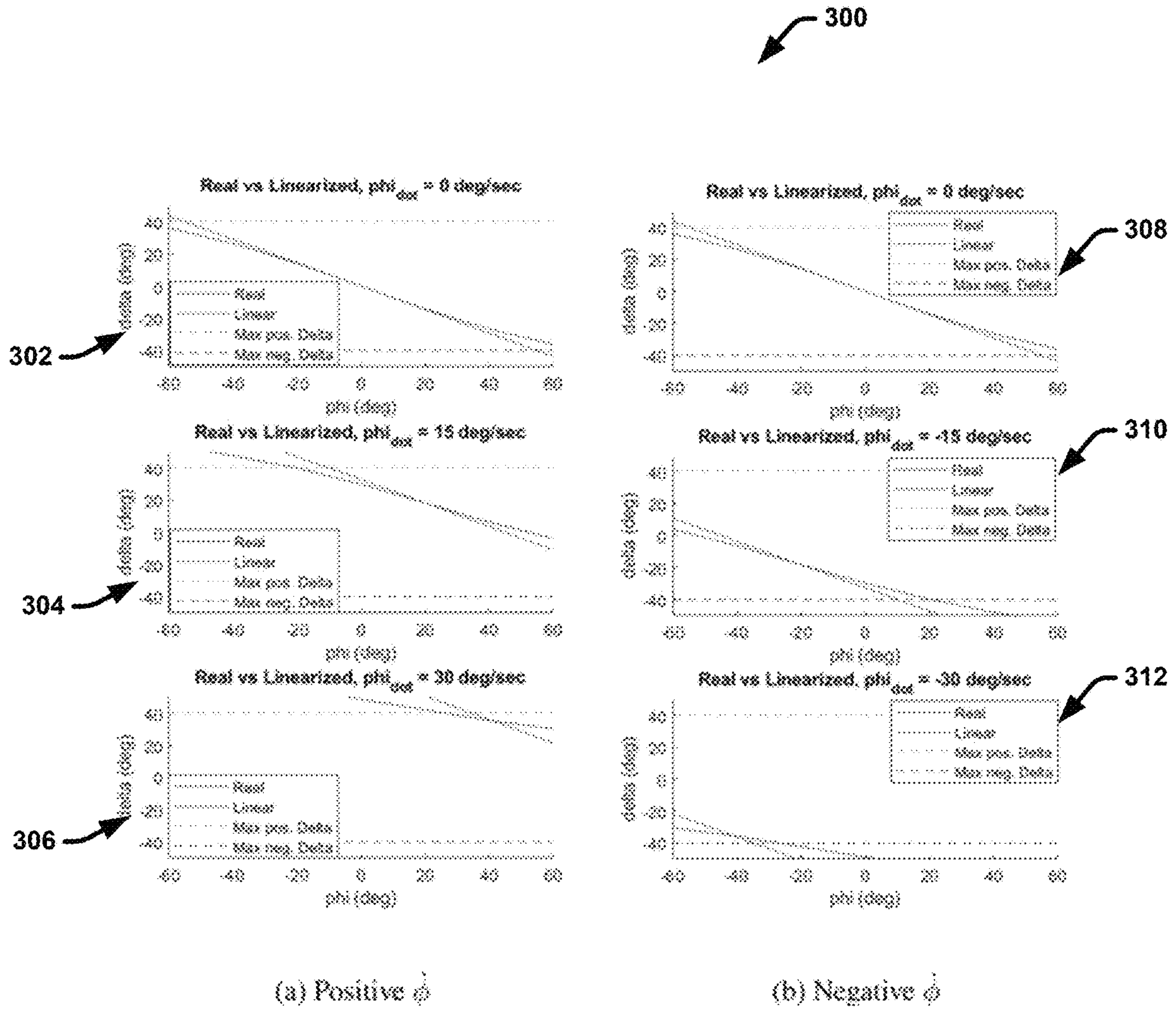
FIG. 3 presents a set of graphs depicting an example, non-limiting evaluation of error between the linear and non-linear equation as presented in the kinematic model in accordance with one or more embodiments described herein.

Next, we see in FIG. 3 an overview of how large the error is between the linear and non-linear equation in different regions.

The linearization gives good results for lower values of $\dot{\phi}$ but for higher values of $\dot{\phi}$ the results are quite far from the actual value. This can be seen in the graphs 302, 304, 306, 308, 310, and 312.

It can also be seen in FIG. 3 that the error of the linearization of the equation is not symmetric around $\phi=0$. This means that the linear equation gives better estimations for large values of $\dot{\phi}$ if it has the same sign as $\phi$. To ensure that the linear model gives accurate control values, emphasis should be laid on limiting $\dot{\phi}$ so that the real model and the linear model's values are sufficiently close as determined by how the system reacts to the input from the driver.

In practice, there is a real limit on the steering angle, the operating regions are limited as shown by dotted lines in the graphs 302, 304, 306, 308, 310, and 312 with steering angle between 40 degrees and −40 degrees. The higher the angular rate is, the narrower the operating region is. As demonstrated, the errors between the linear model and the real model are well under control.

In order to analyze the stability of the trailer back-up assist system, pole position analysis of the system is required. The stability with and without the trailer back-up assist system are examined by checking the eigenvalues of the state-space equations. Eigenvalues are the special set of scalar values associated with the set of linear equations. Eigenvalues are key to understanding the intrinsic properties of linear transformations represented by matrices. They reveal how matrices act on vectors, indicating directions of stretching, compressing, or reversing. Finding eigenvalues involves solving the characteristic polynomial, a fundamental task in linear algebra.

When examining the vehicle-trailer system without any back-up assist, the main equation is Equation 4. The eigenvalue of the system is in the form of $$-\frac{v}{L_3},$$

which lies in the left-hand side of the complex plane if and only if v takes on a positive value, indicating forward driving. In this sense, the system is unstable when reversing. The analysis result matches what happens in reality since driving forward with a trailer is controllable and stable while reversing with a trailer is not. The instability of reversing raises the need for a trailer back-up assist system to ensure that the eigenvalue is in the left-hand side of the complex plane.

Jackknifing is an accident that occurs when a vehicle towing a trailer loses control of the trailer and it swings out to form an L or V shape. The name comes from the resemblance of the angled truck to a folding pocket knife. Jackknifing can more technically be described as the phenomenon when the angle between the vehicle and the trailer enters a region where the angle can no longer be decreased while reversing. For jackknifing to happen, two things have to occur, first the maximum steering angle on the vehicle has to be reached. Second, the angular rate has to be higher for the trailer than for the vehicle. This can be visualized by seeing that the distance to the instant center of rotation of the trailer, $IC_t$ 202, is shorter than it is for the vehicle, $IC_v$ 204, and can be seen in FIG. 2.

Based on Equation 4 and Equation 5, a decision on whether to control $\phi$ or $\dot{\phi}$ can be made and corresponding control loops can be designed and tuned. Equation 5 serves as the steering angle block that connects the control loop with the steering rack on the vehicle. Control loop designs will be shown and explained based on the value to control. No matter what driving mode is going to be implemented on the vehicle, it is either controlling $\phi$ or $\dot{\phi}$ of the trailer back-up assist system.

Figure 4:
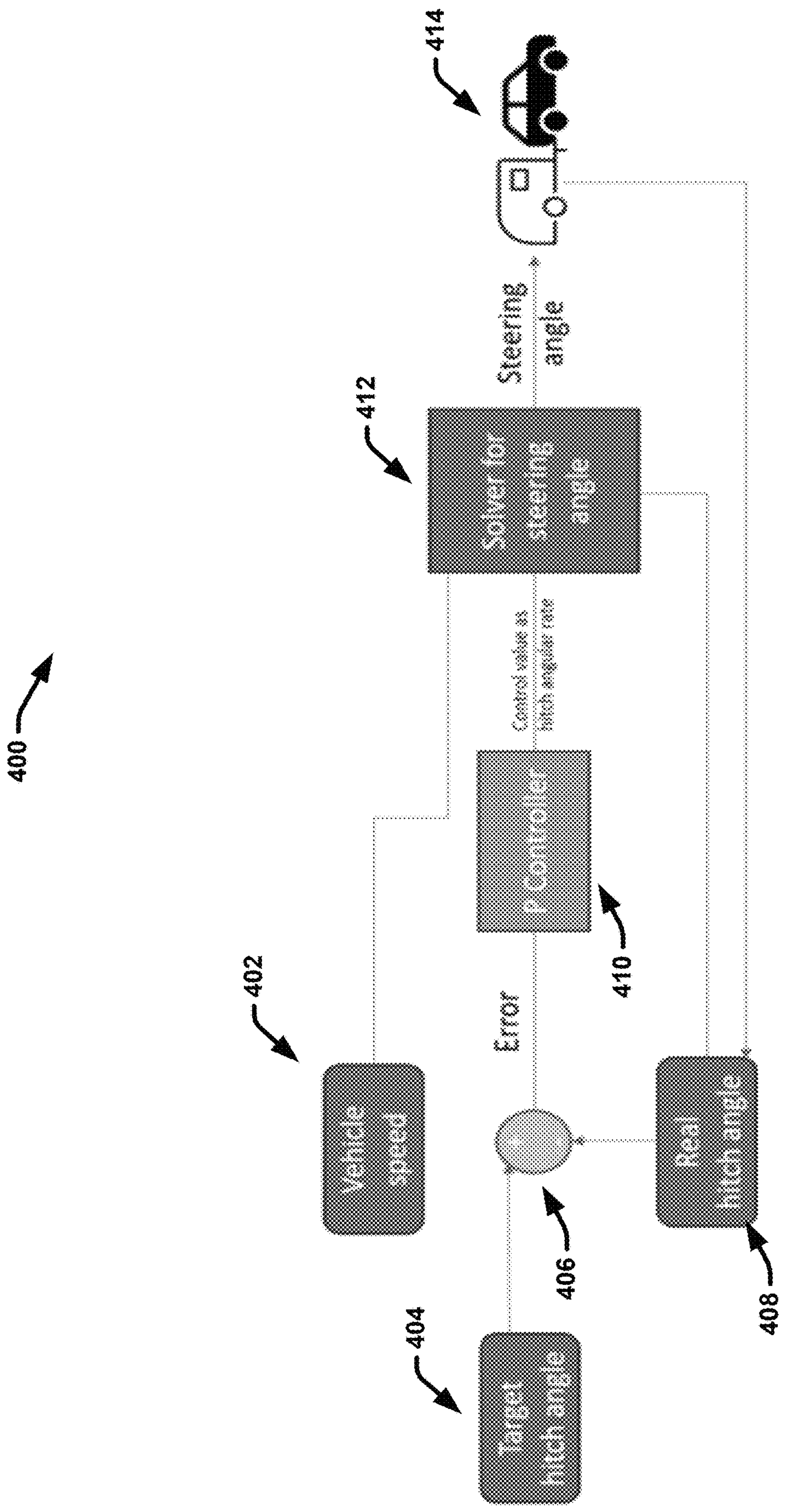
FIG. 4 presents a flow diagram which illustrates an example, non-limiting process related to vehicle-trailer angle control in accordance with one or more embodiments described herein.

In FIG. 4, a flowchart is presented which illustrates a process related to the decision to control $\phi$. When controlling $\phi$, a control value seen in Equation 6 should replace $\dot{\phi}$ in Equation 5 since this is the first-order derivative of time of $\phi$. The control value is based on difference between real-time $\phi$ 408 and target $\phi$ 404, this can be seen as the error value 406. The error value is fed to a P controller (P controller and Controller shall be used interchangeably) 410 which output $\dot{\phi}$ is the input to the steering angle block 412. Vehicle speed 402 is also input into the steering angle block 412. The output of this block is a steering angle that should be on the front wheels of vehicle 414.

In order to perform stability analysis, a control value in Equation 6 needs to replace $\dot{\phi}$ in Equation 5 as shown in Equation 7 where k is the $k_p$ for the P controller 410.

$$\dot{\phi}_{target} = k \cdot (\phi_{target} - \phi) \tag{6}$$

$$\delta_{target} = \frac{\dot{\phi}_{target} + \frac{v}{L_3} \cdot \phi}{-\frac{v}{L_1} \cdot \left(1 + \frac{L_2}{L_3}\right)} \tag{7}$$

$$\dot{\phi} = -\frac{v}{L_3} \cdot \phi - \frac{v}{L_1} \cdot \left(1 + \frac{L_2}{L_3}\right) \cdot \delta_{target} \tag{8}$$

Equation 8 is generated by applying Equation 7 to Equation 4, after which the eigenvalue of the system is changed to (−k). When the vehicle-trailer system is reversing, v is a negative value. To ensure the stability of reversing, k needs to be larger than 0 so that the eigenvalue lies in the left-hand side of the complex plane.

Figure 5:
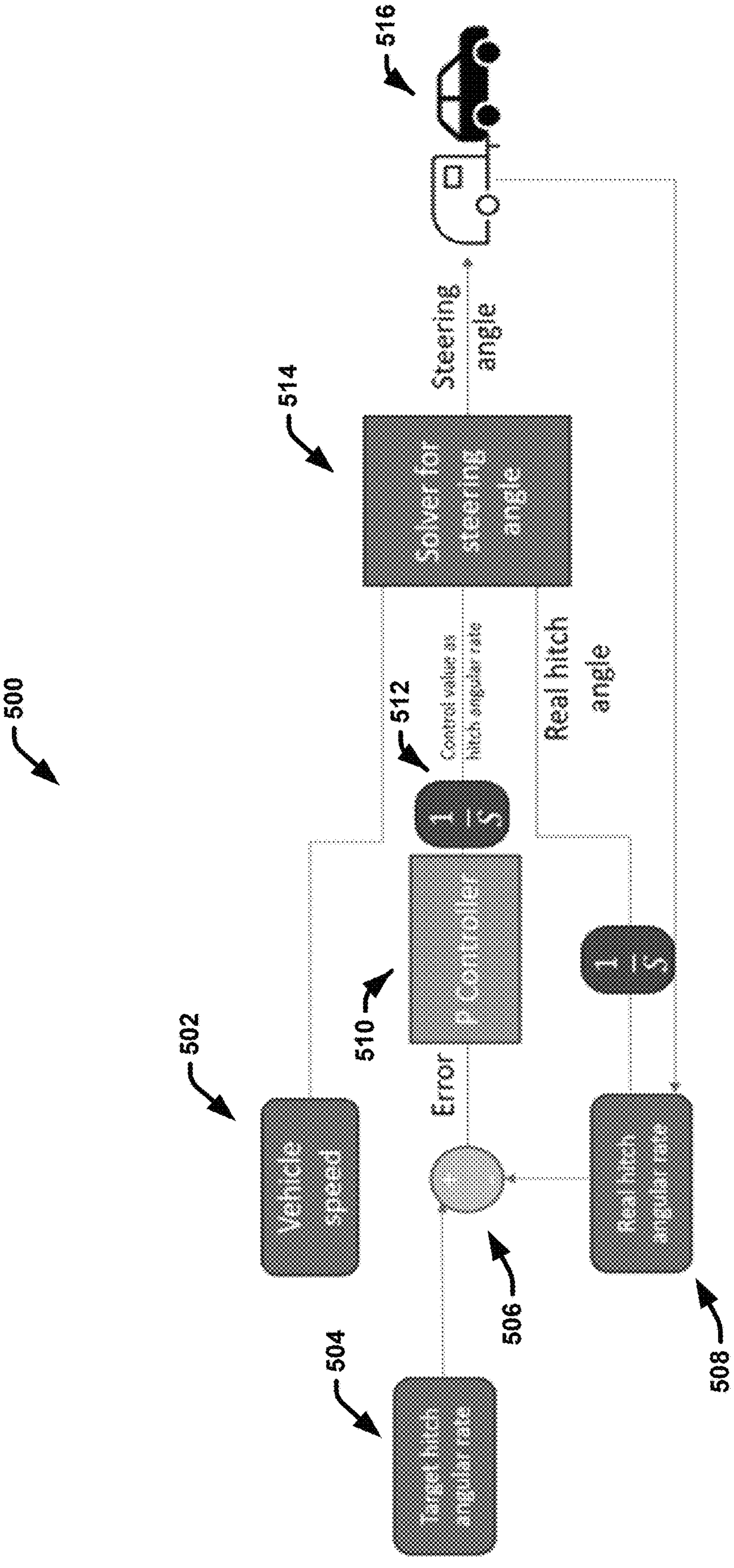
FIG. 5 presents a flow diagram which illustrates an example, non-limiting process related to demanded angular rate control in accordance with one or more embodiments described herein.

Next, we turn to examining FIG. 5, in which a flowchart is presented illustrating the process related to the decision to control $\dot{\phi}$. For controlling $\dot{\phi}$, the control value from a P controller 510 that is based on the error $\dot{\phi}$ 506 between the target 504 and the real-time value 508 should represent $\ddot{\phi}$. To use the Equation 5, the control value needs to be integrated over time 1/S 512. The stability condition is the same as before, when controlling $\phi$, with a k larger than 0 then the system is stable, since the eigenvalue lies in the left-hand side of the complex plane. Vehicle speed 502 is also input into the steering angle block 514. The output of this block is a steering angle that should be on the front wheels of vehicle 516.

As demonstrated the length of the trailer to its wheel axle ($L_3$) is a needed input for the model described thus far. If the length estimation of the trailer is done manually by the driver, this is a cumbersome process. The length of the trailer is not always known and it can be difficult to accurately measure the length. Therefore, it would be beneficial if there was a way for the vehicle to determine the length of the trailer on its own accurately. This could be done using an error prediction method, using the parameter value that minimizes the quadratic sum of the prediction errors. But to make the system compact and more efficient, another simple yet effective way of determining the length of the trailer is created and utilized. This is by using Equation 3 to derive the length of the trailer $L_3$. The equation for $L_3$ can be seen in Equation 9.

$$L_3 = -\frac{v \cdot (\sin(\phi) \cdot L_1 + L_2 \cdot \cos(\phi) \cdot \tan(\delta))}{\dot{\phi} \cdot L_1 + v \cdot \tan(\delta)} \tag{9}$$

This equation, Equation 9, will provide length of the trailer whenever all variables in the equation are stable. The system automatically starts length estimation the moment the driver drives the vehicle forward after the trailer is connected to the vehicle for the first time. The vehicle-hitch angle as well as its angular rate, steering angle, and vehicle speed will be recorded during a short period when there is a stable set of inputs from the driver and the distance between the trailer axle and the tow hook can be calculated using Equation 9.

The easiest way to get stable inputs is to start the length estimation while going forward in a circle with a fixed steering angle. This means that $\dot{\phi}$ and $\phi$ will move towards a steady value. This will make the equation easier to solve as well as make the result more stable. If the trailer gets replaced by a different trailer, the system will work again to estimate the new geometry. In theory, the estimation also works during reversing if the trailer assist system is not active. After the automatic length estimation, the result will be sent to the controller as input of trailer length. The driver could also choose to manually input the length through the GUI in the car.

Figure 6:
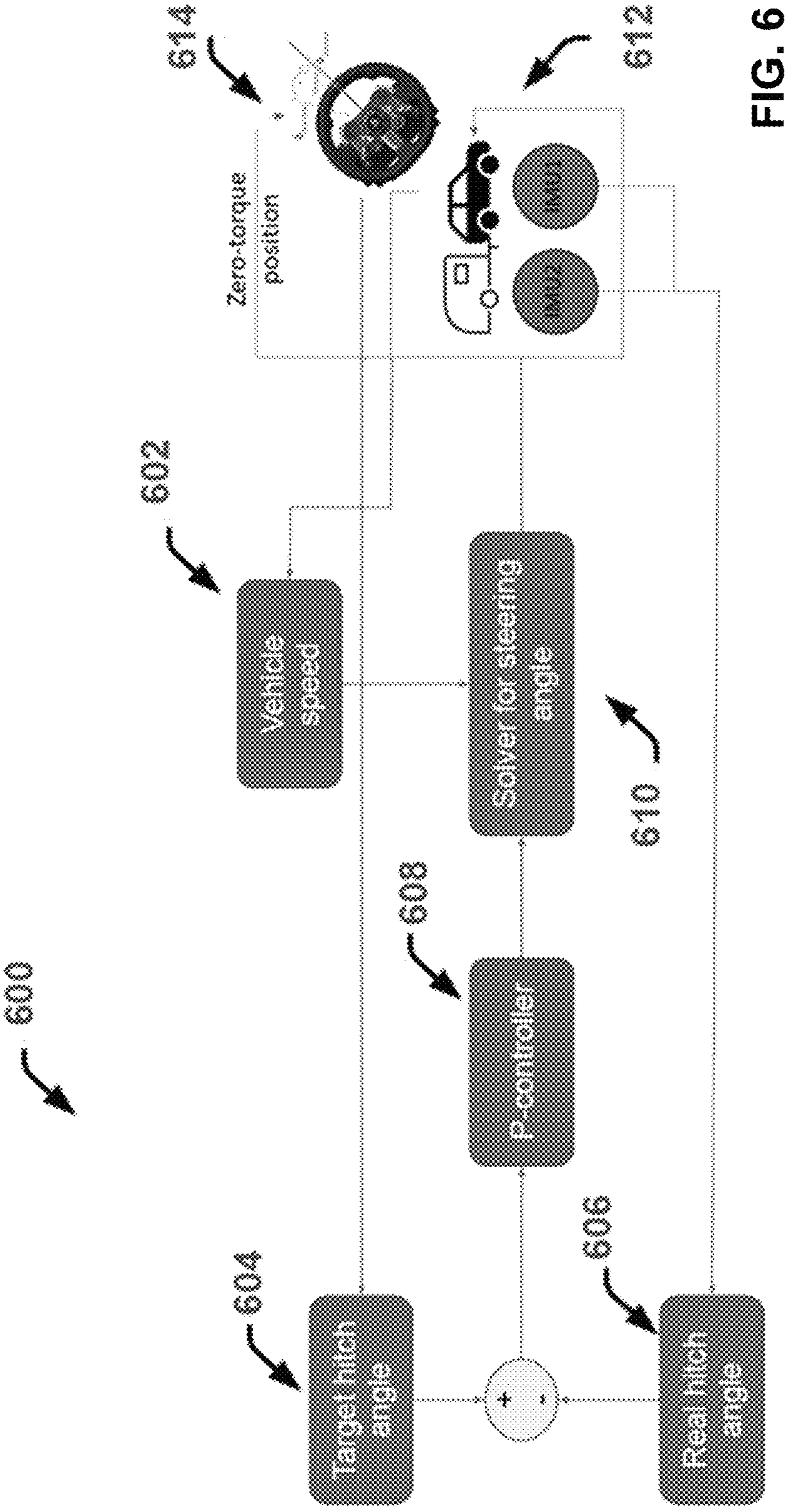
FIG. 6 is a flow chart showing how the torque on the steering wheel is defined which illustrates an example, non-limiting system in accordance with one or more embodiments described herein.

FIG. 6 is a flow chart showing how torque on the steering wheel is defined, the control value from a P controller 608 that receives an input of the error between the target 604 and the real-time value 606. Vehicle speed 602 is also input into the steering angle block 610. The output of this block is a steering angle that should be on the front wheels of vehicle 612. The angle between the car and trailer can be determined in different ways, we developed two ways of doing it. Firstly, we used two IMUs 612, one in the car and one in the trailer, then we integrated their yaw rate over time to get their respective yaw angle, and from that we can get the car-trailer angle. The zero-torque position of the steering wheel 614 always follows the real-time car-trailer angle.

Figure 7A:
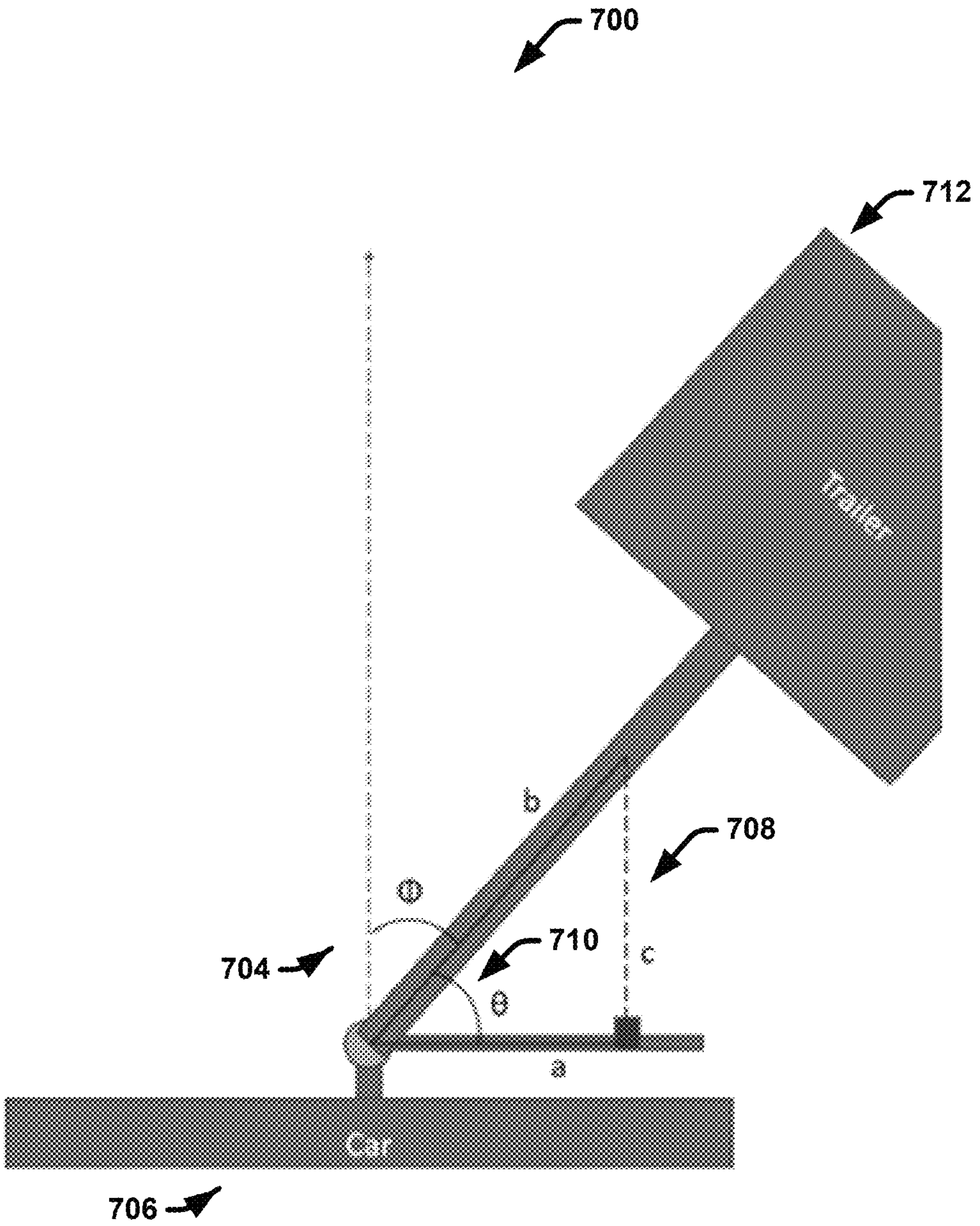
FIGS. 7A-7D illustrate various embodiments of innovations described herein.

The car-trailer angle can also be determined using a linear transducer, based on the length of the rope of the linear transducer and the geometry of the system as can be seen in the FIG. 7A.

In the trailer back-up assist system, detecting the angle between the vehicle and the trailer is a key intermediate procedure. Based on such information, the controller can command the steering system to keep or change the vehicle-trailer angle based on control mode and user input. A mechanical measurement and an inertial measurement of determining the angle will be considered, but this could also be done with computer vision.

FIG. 7A illustrates a diagram related to an example, non-limiting geometric angle calculation using a linear transducer in accordance with one or more embodiments described herein. 706 and 712 refer to the car and trailer respectively. Mechanical angle estimation can be performed using a linear transducer. The linear transducer determines $\phi$ 704 by calculating angles 710 within a triangle that is structured as shown in FIG. 7A. Since a linear transducer often has a very high accuracy down to an error of (+0.25%) this means that this method of estimating the angle can be very accurate.

The law of cosine provides:

$$\theta = \arccos\left(\frac{a^2 + b^2 - c^2}{2 \cdot a \cdot b}\right) \tag{10}$$

The basic law of sum gives:

$$\phi = \left|\theta - \frac{\pi}{2}\right| \tag{11}$$

In this case, a is the lateral length of the rod to the connection point of the linear transducer (SP1-12), b is the length from the hitch hook to the connection point on the trailer and c 708 is the length of the extended wire of the linear transducer. These lengths can be seen in FIG. 7A. Since the wire on the linear transducer is of a certain length, it is also important to make sure that the wire will not break during any maneuver due to the wire being too short.

Figure 7B:
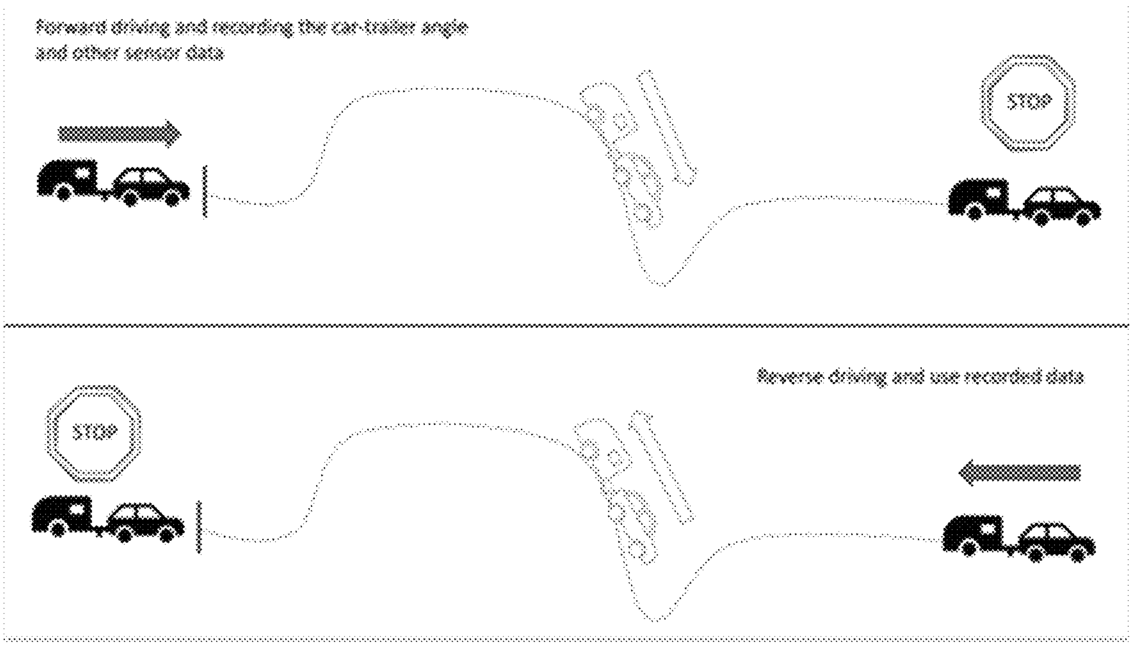

In another embodiment as depicted in FIG. 7B, relates to recorded maneuver where the vehicle can record and store data on maneuver, both sensor data but also data on angles between the vehicle and trailer over time. This would make it possible for the vehicle to reverse the trailer into any spot that vehicle car has driven out from. Instead of recording the path, the hitch angle shall be recorded to guide the reverse process since the dynamics for forward and reverse driving with a trailer is different. Furthermore, it will be difficult for the car to end up in the exact same spot as the end position when driving forward, an AI or a human in the loop might be needed to help the car to get into that position to begin the reverse with as well as correcting errors during the reverse process. This could be very popular for drivers who need to park a trailer from time to time to a fixed parking area. This system could also upload stored data to a cloud which would make it possible for other vehicles to use the same path to get into the required path.

Figure 7C:
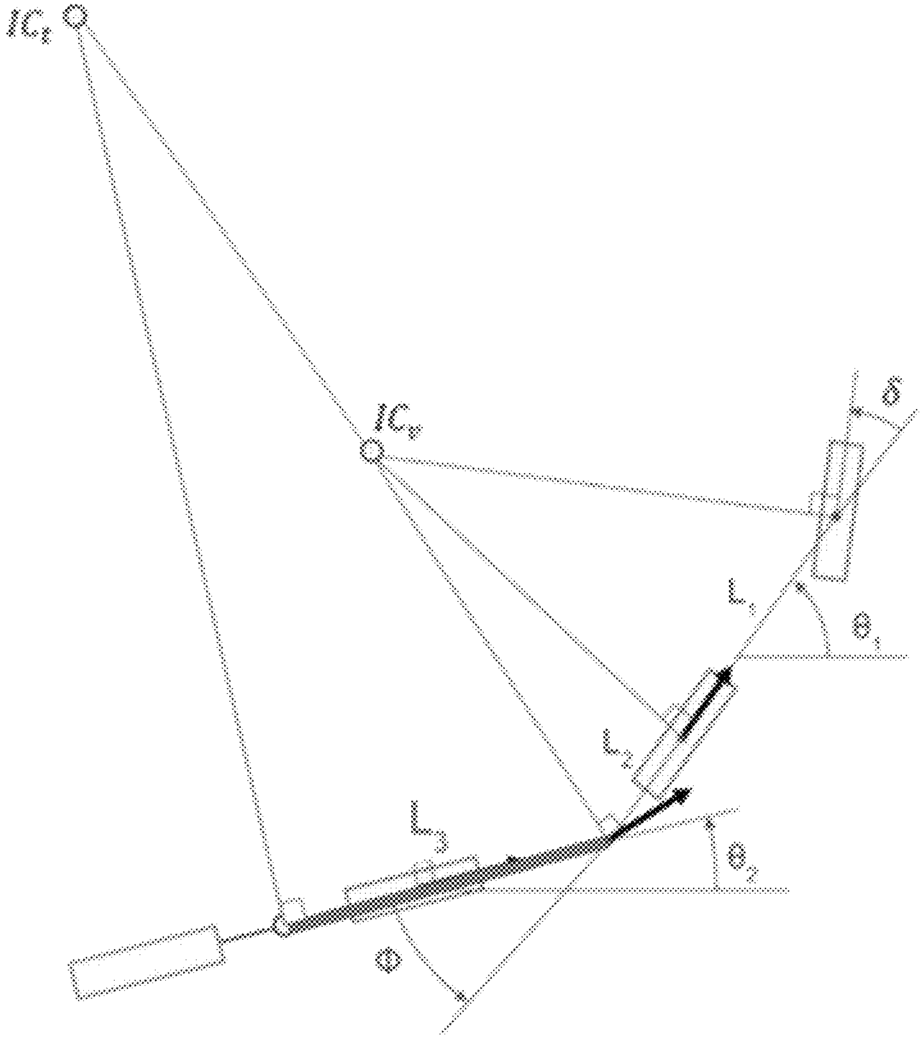

Another embodiment as illustrated in FIG. 7C, related to multi-axle vehicle potential. This system is not only viable for passenger cars, it can easily be used on a truck as well but then L3 means the distance between the tow hook and the average axle center position on the trailer.

Figure 7D:
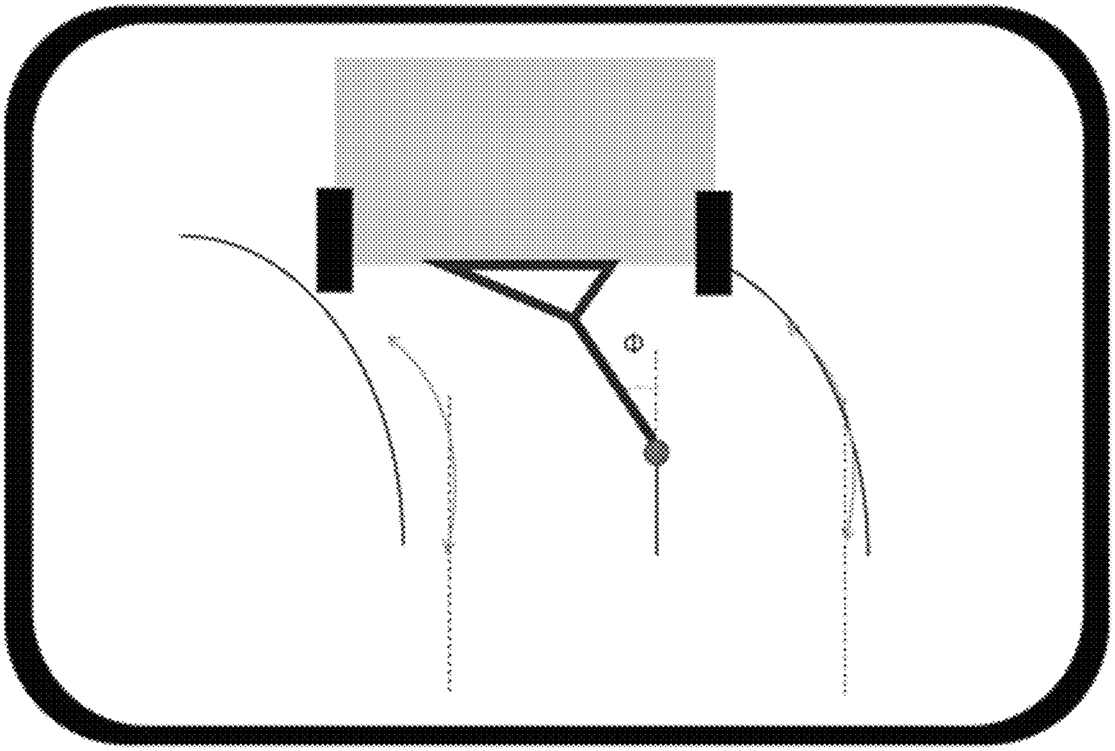

Yet another embodiment as depicted in FIG. 7D, relates to warning and feedback on the user interface. The system can be assisted with a warning & feedback interface so that the driver gets more information when using it. For example, when the road condition is complicated such as being very inclined or very slippery, the system will inform the driver of the potential danger detected by itself. Also, the system warns the driver of nearby obstacles and shut the progress when needed. The user interface shows information on the central screen or with the Heads-up Display (HUD).

Another embodiment relates to remote driver. This system could also be used in cases where autonomous driven vehicles drive with a trailer and get stuck in some way. Then a person in a remote place could take over the steering of the autonomous car and help the autonomous car get out of the tricky situation. This system could also use external cameras from the nearby area to help the remote driver to reverse the trailer in a safe way.

An embodiment relates to rear-wheel turning on the car. To make the system more reactive and more agile, the car can be further equipped with a rear-wheel turning function. The geometry on the car part (expression for its yaw rate) will be slightly changed but the system should work in theory.

An embodiment relates to zero torque positioning. A steering wheel orientation is linearly related to hitch angle such that in a zero position, the vehicle and trailer are directly aligned in parallel. Thus, steering angle and hitch angle are at a zero position, as the steering wheel angle is changed the hitch angle is changed in linear proportion. For example, if the steering wheel angle is at 45 degrees, the hitch angle is likewise 45 degrees. If the steering wheel angle is 90 degrees, the hitch angle is 90 degrees relative to the vehicle. With such embodiment, the driver has greater certainty as to orientation of the trailer relative to vehicle and thus able to effect precise controlled positioning of the trailer. It is to be appreciated that non-linear relationships that can affect accurate control of trailer position via the steering wheel are contemplated and can be employed in connection with various embodiments.

This could be useful for truck/semi-truck drivers to get into the required position for the loading bay, since the vehicle usually uses the same path of travel to get into the area.

Figure 8:
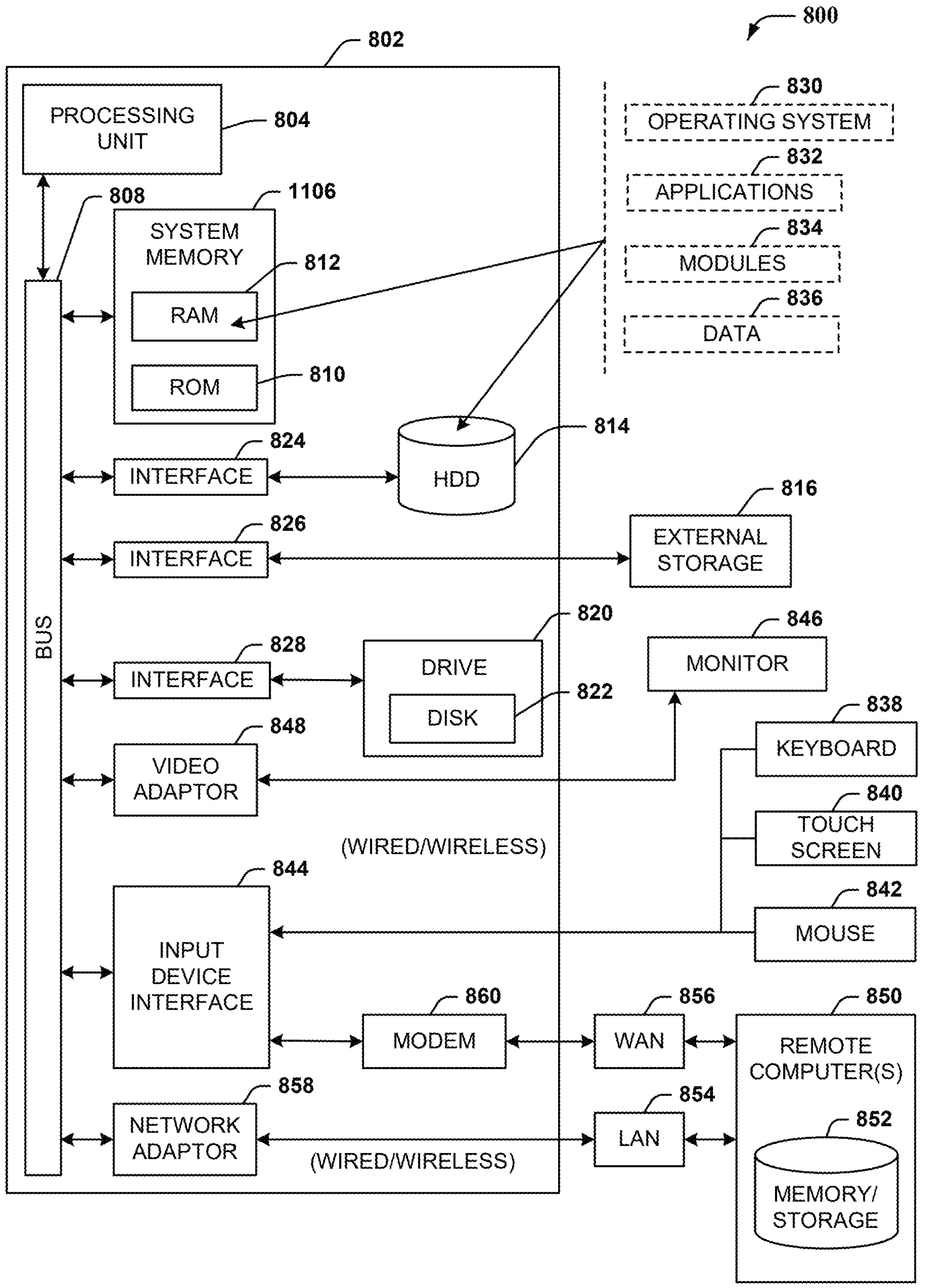
FIG. 8 illustrates a block diagram of an example, non-limiting operating environment in which one or more embodiments described herein can be facilitated.

With reference to FIG. 8, an example environment 800 for implementing various embodiments of the aspects described herein includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures can also be employed as the processing unit 804.

The system bus 808 can be any of several types of bus structure that can further interconnect to a memory bus (with or without a memory controller), a peripheral bus, and a local bus using any of a variety of commercially available bus architectures. The system memory 806 includes ROM 88 and RAM 812. A basic input/output system (BIOS) can be stored in a non-volatile memory such as ROM, erasable programmable read only memory (EPROM), EEPROM, which BIOS contains the basic routines that help to transfer information between elements within the computer 802, such as during startup. The RAM 812 can also include a high-speed RAM such as static RAM for caching data.

The computer 802 further includes an internal hard disk drive (HDD) 814 (e.g., EIDE, SATA), one or more external storage devices 816 (e.g., a magnetic floppy disk drive (FDD) 816, a memory stick or flash drive reader, a memory card reader, etc.) and a drive 820, e.g., such as a solid state drive, an optical disk drive, which can read or write from a disk 822, such as a CD-ROM disc, a DVD, a BD, etc. Alternatively, where a solid state drive is involved, disk 822 would not be included, unless separate. While the internal HDD 814 is illustrated as located within the computer 802, the internal HDD 814 can also be configured for external use in a suitable chassis (not shown). Additionally, while not shown in environment 800, a solid state drive (SSD) could be used in addition to, or in place of, an HDD 814. The HDD 814, external storage device(s) 816 and drive 820 can be connected to the system bus 808 by an HDD interface 824, an external storage interface 826 and a drive interface 828, respectively. The interface 824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 812, including an operating system 830, one or more application programs 832, other program modules 834 and program data 836. All or portions of the operating system, applications, modules, or data can also be cached in the RAM 812. The systems and methods described herein can be implemented utilizing various commercially available operating systems or combinations of operating systems.

Computer 802 can optionally comprise emulation technologies. For example, a hypervisor (not shown) or other intermediary can emulate a hardware environment for operating system 830, and the emulated hardware can optionally be different from the hardware illustrated in FIG. 8. In such an embodiment, operating system 830 can comprise one virtual machine (VM) of multiple VMs hosted at computer 802. Furthermore, operating system 830 can provide runtime environments, such as the Java runtime environment or the .NET framework, for applications 832. Runtime environments are consistent execution environments that allow applications 832 to run on any operating system that includes the runtime environment. Similarly, operating system 830 can support containers, and applications 832 can be in the form of containers, which are lightweight, standalone, executable packages of software that include, e.g., code, runtime, system tools, system libraries and settings for an application.

Further, computer 802 can be enable with a security module, such as a trusted processing module (TPM). For instance, with a TPM, boot components hash next in time boot components, and wait for a match of results to secured values, before loading a next boot component. This process can take place at any layer in the code execution stack of computer 802, e.g., applied at the application execution level or at the operating system (OS) kernel level, thereby enabling security at any level of code execution.

A user can enter commands and information into the computer 802 through one or more wired/wireless input devices, e.g., a keyboard 838, a touch screen 840, and a pointing device, such as a mouse 842. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 804 through an input device interface 844 that can be coupled to the system bus 808, but can be connected by other interfaces, such as a parallel port, an IEEE 1394 serial port, a game port, a USB port, an IR interface, a BLUETOOTH® interface, etc.

A monitor 846 or other type of display device can be also connected to the system bus 808 via an interface, such as a video adapter 848. In addition to the monitor 846, a computer typically includes other peripheral output devices (not shown), such as speakers, printers, etc.

The computer 802 can operate in a networked environment using logical connections via wired or wireless communications to one or more remote computers, such as a remote computer(s) 850. The remote computer(s) 850 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 852 is illustrated. The logical connections depicted include wired/wireless connectivity to a local area network (LAN) 854 or larger networks, e.g., a wide area network (WAN) 856. Such LAN and WAN networking environments are commonplace in offices and companies, and facilitate enterprise-wide computer networks, such as intranets, all of which can connect to a global communications network, e.g., the Internet.

The computer 802 can operate in a networked environment using logical connections via wireless communications based GPRS, GSM, 5G, LTE, 6G protocols.

When used in a LAN networking environment, the computer 802 can be connected to the local network 854 through a wired or wireless communication network interface or adapter 858. The adapter 858 can facilitate wired or wireless communication to the LAN 854, which can also include a wireless access point (AP) disposed thereon for communicating with the adapter 858 in a wireless mode.

When used in a WAN networking environment, the computer 802 can include a modem 860 or can be connected to a communications server on the WAN 856 via other means for establishing communications over the WAN 856, such as by way of the Internet. The modem 860, which can be internal or external and a wired or wireless device, can be connected to the system bus 808 via the input device interface 844. In a networked environment, program modules depicted relative to the computer 802 or portions thereof, can be stored in the remote memory/storage device 852. It will be appreciated that the network connections shown are an example and other means of establishing a communications link between the computers can be used.

When used in either a LAN or WAN networking environment, the computer 802 can access cloud storage systems or other network-based storage systems in addition to, or in place of, external storage devices 816 as described above, such as but not limited to a network virtual machine providing one or more aspects of storage or processing of information. Generally, a connection between the computer 802 and a cloud storage system can be established over a LAN 854 or WAN 856 e.g., by the adapter 858 or modem 860, respectively. Upon connecting the computer 802 to an associated cloud storage system, the external storage interface 826 can, with the aid of the adapter 858 or modem 860, manage storage provided by the cloud storage system as it would other types of external storage. For instance, the external storage interface 826 can be configured to provide access to cloud storage sources as if those sources were physically connected to the computer 802.

The computer 802 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 9:
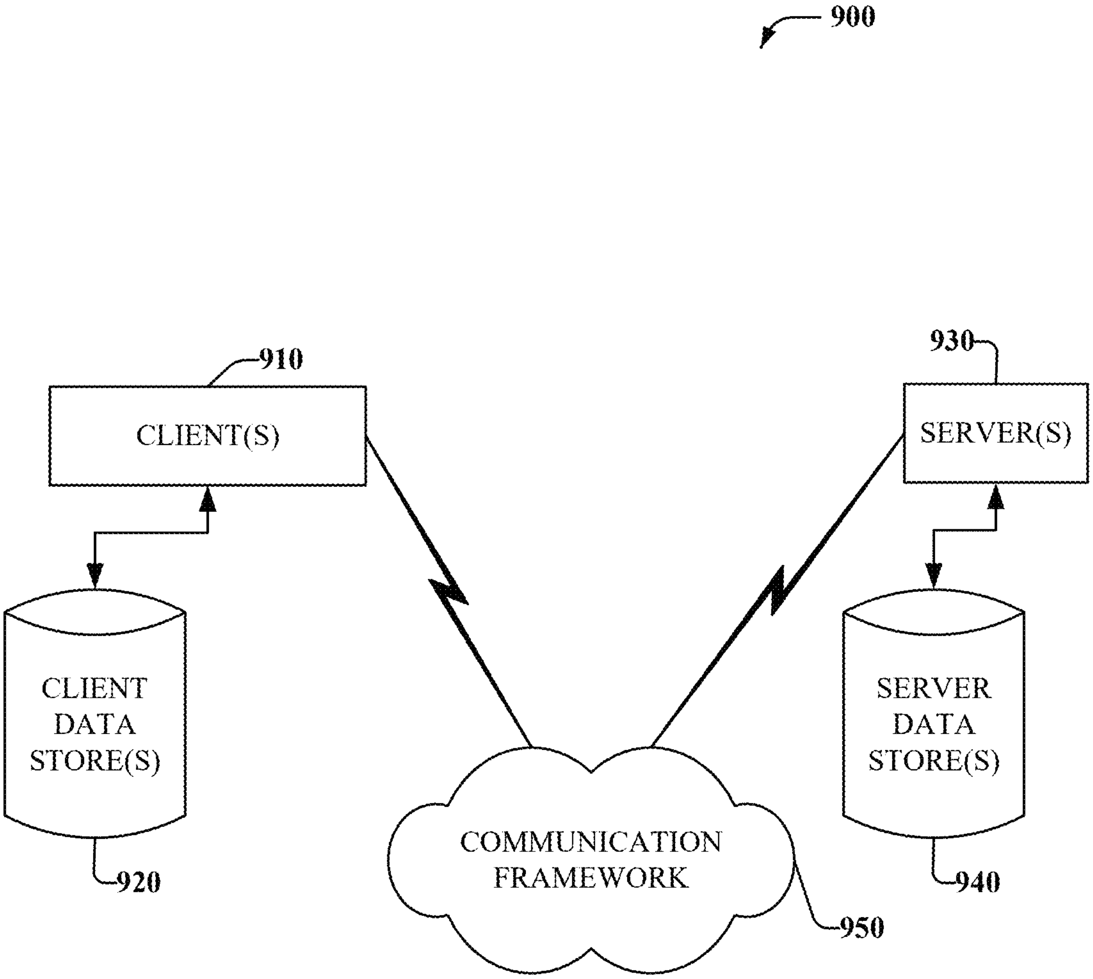
FIG. 9 illustrates an example networking environment operable to execute various implementations described herein.

FIG. 9 is a schematic block diagram of a sample computing environment 900 with which the disclosed subject matter can interact. The sample computing environment 900 includes one or more client(s) 910. The client(s) 910 can be hardware or software (e.g., threads, processes, computing devices). The sample computing environment 900 also includes one or more server(s) 930. The server(s) 930 can also be hardware or software (e.g., threads, processes, computing devices). The servers 930 can house threads to perform transformations by employing one or more embodiments as described herein, for example. One possible communication between a client 910 and a server 930 can be in the form of a data packet adapted to be transmitted between two or more computer processes. The sample computing environment 900 includes a communication framework 950 that can be employed to facilitate communications between the client(s) 910 and the server(s) 930. The client(s) 910 are operably connected to one or more client data store(s) 920 that can be employed to store information local to the client(s) 910. Similarly, the server(s) 930 are operably connected to one or more server data store(s) 940 that can be employed to store information local to the servers 930.

The present invention may be a system, a method, an apparatus or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations or block diagrams of methods, apparatus (systems), and computer program products according to embodiments of the invention. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above includes mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

One or more embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Various aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing one or more embodiments, but one of ordinary skill in the art can recognize that many further combinations and permutations of these embodiments are possible. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The terminology used herein was chosen to best explain the principles of the embodiments, the practical application or technical improvement over technologies found in the marketplace, or to enable others of ordinary skill in the art to understand the embodiments disclosed herein. In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various non-limiting aspects of various embodiments described herein are presented in the following clauses.

1. A vehicle maneuvering system, comprising a processor and a memory communicatively coupled to the processor, the memory having stored therein computer-executable instructions, comprising a steer-by-wire component configured to receive steering wheel input and navigate the vehicle in reverse mode and a hitch angle component that estimates hitch angle of a trailer coupled to the vehicle, and estimates angular rate of the hitch angle through the data gathered from the hitch angle component and a controller that controls speed of the vehicle and steering wheel angle input to maintain the hitch angle within a stable range.

2. The system of any preceding clause, wherein the controller facilitates maintaining a zero-torque relationship with the steering wheel angle and hitch angle.

3. The system of any preceding clause, wherein artificial intelligence has been implicitly trained to facilitate the controller maintaining the hitch angle within the stable range.

4. The system of any preceding clause, wherein artificial intelligence has been explicitly trained to facilitate the controller maintaining the hitch angle within the stable range.

5. The system of any preceding clause, wherein the controller estimates the steering angle of the vehicle using the following equation:

$$\delta = \frac{\dot{\phi} + \frac{v}{L_3} \cdot \phi}{-\frac{v}{L_1} \cdot \left(1 + \frac{L_2}{L_3}\right)}$$

wherein:

$L_1$ is wheelbase of the vehicle;

$L_2$ is length from a tow hook to rear axle of the vehicle;

$L_3$ is length from the tow hook to axle on the trailer;

V is velocity of the vehicle; and

Φ is angle between the vehicle and the trailer.

6. The system of any preceding clause, wherein the controller maintains the hitch angle to below a threshold that can result in jack knifing of the trailer.

7. The system of any preceding clause, wherein the controller estimates the length of the trailer ($L_3$) using the following equation:

$$L_3 = -\frac{v \cdot (\sin(\phi) \cdot L_1 + L_2 \cdot \cos(\phi) \cdot \tan(\delta))}{\dot{\phi} \cdot L_1 + v \cdot \tan(\delta)}.$$

8. The system of any preceding clause, wherein a linear transducer is used to estimate Φ, angle between the vehicle and the trailer.

9. The system of any preceding clause, wherein a set of yaw sensors facilitate estimating Φ, the angle between the vehicle and the trailer, wherein the controller integrates difference between vehicle and trailer yaw angular rate ($\theta\text{dot}_1$ and $\theta\text{dot}_2$) over time.

In various cases, any suitable combination or combinations of clauses 1-9 can be implemented.

10. A computer implemented method, comprising configuring by the system to receive steering wheel input and navigate the vehicle in reverse mode and estimating by the system a hitch angle of a trailer coupled to the vehicle, and estimating by the system an angular rate of the hitch angle through the data gathered from the hitch angle component and controlling by the system, the speed of the vehicle and steering wheel angle input to maintain the hitch angle within a stable range.

11. A computer implemented method of any preceding clause, wherein the controller facilitates maintaining a zero-torque relationship with the steering wheel angle and hitch angle.

12. A computer implemented method of any preceding clause, further comprising implementing by the system, artificial intelligence that has been implicitly trained to facilitate the controller maintaining the hitch angle within the stable range.

13. A computer implemented method of any preceding clause, further comprising implementing by the system, artificial intelligence that has been explicitly trained to facilitate the controller maintaining the hitch angle within the stable range.

14. A computer implemented method of any preceding clause, further comprising estimating by the system, the steering angle of the vehicle using the following equation:

$$\delta = \frac{\dot{\phi} + \frac{v}{L_3} \cdot \phi}{-\frac{v}{L_1} \cdot \left(1 + \frac{L_2}{L_3}\right)}$$

wherein:

$L_1$ is wheelbase of the vehicle;

$L_2$ is length from a tow hook to rear axle of the vehicle;

$L_3$ is length from the tow hook to axle on the trailer;

V is velocity of the vehicle; and

Φ is angle between the vehicle and the trailer.

15. A computer implemented method of any preceding clause, further comprising maintaining by the system the hitch angle to below a threshold that can result in jack knifing of the trailer.

16. A computer implemented method of any preceding clause, further comprising estimating by the system the length of the trailer ($L_3$) using the following equation:

$$L_3 = -\frac{v \cdot (\sin(\phi) \cdot L_1 + L_2 \cdot \cos(\phi) \cdot \tan(\delta))}{\dot{\phi} \cdot L_1 + v \cdot \tan(\delta)}$$

17. A computer implemented method of any preceding clause, further comprising estimating by the system Φ, the angle between the vehicle and the trailer using a linear transducer.

18. A computer implemented method of any preceding clause, further comprising estimating by the system Φ using a set of yaw sensors, the angle between the vehicle and the trailer, wherein the controller integrates difference between vehicle and trailer yaw angular rate ($\theta^{dot}{}_1$ and $\theta^{dot}{}_2$) over time.

In various cases, any suitable combination or combinations of clauses 11-18 can be implemented.

19. A computer program product for a vehicle maneuvering system, the computer program product from any preceding clause comprising a non-transitory computer readable storage medium having program instructions embodied therewith, the program instructions executable by a processor on board to cause the processor to configure steer by wire to receive steering wheel input and navigate the vehicle in reverse mode and estimate the hitch angle of a trailer coupled to the vehicle, and estimate the angular rate of the hitch through the data gathered from the hitch angle component and control the speed of the vehicle and steering wheel angle input to maintain the hitch angle within a stable range.

20. A computer program product for a vehicle maneuvering system, the computer program product from any preceding clause comprising a non-transitory computer readable storage medium having program instructions embodied therewith, the program instructions executable by a processor on board to cause the processor to implement artificial intelligence that has been implicitly trained to facilitate the controller maintaining the hitch angle within the stable range.

21. A computer program product for a vehicle maneuvering system, the computer program product from any preceding clause comprising a non-transitory computer readable storage medium having program instructions embodied therewith, the program instructions executable by a processor on board to cause the processor to implement artificial intelligence that has been explicitly trained to facilitate the controller maintaining the hitch angle within the stable range.

22. A computer program product for a vehicle maneuvering system, the computer program product from any preceding clause comprising a non-transitory computer readable storage medium having program instructions embodied therewith, the program instructions executable by a processor on board to cause the processor to estimate the steering angle of the vehicle using the following equation:

$$\delta = \frac{\dot{\phi} + \frac{v}{L_3} \cdot \phi}{-\frac{v}{L_1} \cdot \left(1 + \frac{L_2}{L_3}\right)}$$

wherein:

$L_1$ is wheelbase of the vehicle;

$L_2$ is length from a tow hook to rear axle of the vehicle;

$L_3$ is length from the tow hook to axle on the trailer;

V is velocity of the vehicle; and

Φ is angle between the vehicle and the trailer.

In various cases, any suitable combination or combinations of clauses 19-24 can be implemented. 23. A computer program product for a vehicle maneuvering system, the computer program product from any preceding clause comprising a non-transitory computer readable storage medium having program instructions embodied therewith, the program instructs are further executable by the processor to cause the processor to: maintain the hitch angle to below a threshold that can result in jack knifing of the trailer.

24. A computer program product for a vehicle maneuvering system, the computer program product from any preceding clause comprising a non-transitory computer readable storage medium having program instructions embodied therewith, the program instructs are further executable by the processor to cause the processor to:

Estimate the length of the trailer ($L_3$) using the following equation:

$$L_3 = -\frac{v \cdot (\sin(\phi) \cdot L_1 + L_2 \cdot \cos(\phi) \cdot \tan(\delta))}{\dot{\phi} \cdot L_1 + v \cdot \tan(\delta)}.$$

In various cases, any suitable combination or combinations of clauses 19-24 can be implemented.

What is claimed is:

1. A vehicle maneuvering system, comprising:

a memory configured to store computer-executable components; and a processor configured to execute at least one of the computer-executable components that:

receive, by the processor, electronic signals comprising steering wheel input representing a desired vehicle-trailer hitch angle; and based on the electronic signals, navigate, by the processor, the vehicle in reverse mode by generating steering rack commands based on the desired vehicle-trailer hitch angle, wherein navigating the vehicle in reverse mode comprises:

based on a kinematic model having parameters comprises a wheelbase, a length from a tow hook to a rear axle of the vehicle, and a length from the tow hook to an axle on the trailer, estimating, by the processor, hitch angle of a trailer coupled to the vehicle, and an angular rate of the hitch angle using the data gathered during the navigating; and controls, using a linearization of the kinematic model, a speed of the vehicle and a steering wheel angle input of the vehicle to maintain the hitch angle within a stable range.

2. The system of claim 1, wherein the at least one of the computer-executable components further:

maintains, by the processor, a zero-torque relationship such that a zero-torque position of the steering wheel always follows a real-time value of the hitch angle, whereby torque on the steering wheel is generated as a sum of a spring-like term based on a difference between a target hitch angle and the real-time hitch angle, and a damper-like term based on an angular rate of the steering wheel.

3. The system of claim 1, wherein the processor employs an artificial intelligence model that has been implicitly trained to facilitate maintaining the hitch angle within the stable range.

4. The system of claim 1, wherein the processor employs an artificial intelligence model that has been explicitly trained to facilitate maintaining the hitch angle within the stable range.

5. The system of claim 1, wherein the controller estimates steering angle of the vehicle using the following equation:

$$\delta = \frac{\dot{\phi} + \frac{v}{L_3} \cdot \phi}{-\frac{v}{L_1} \cdot \left(1 + \frac{L_2}{L_3}\right)}$$

wherein:

$L_1$ is wheelbase of the vehicle;

$L_2$ is length from a tow hook to rear axle of the vehicle;

$L_3$ is length from the tow hook to axle on the trailer;

V is velocity of the vehicle; and

Φ is angle between the vehicle and the trailer.

6. The system of claim 5, further comprising a length estimation component that estimates length of the trailer ($L_3$) using the following equation:

$$L_3 = -\frac{v \cdot (\sin(\phi) \cdot L_1 + L_2 \cdot \cos(\phi) \cdot \tan(\delta))}{\dot{\phi} \cdot L_1 + v \cdot \tan(\delta)}.$$

7. The system of claim 1, wherein the at least one of the computer-executable components further:

maintains, by the processor, the hitch angle to below a threshold that can result in jack knifing of the trailer.

8. The system of claim 1, further comprising a linear transducer that estimates Φ, angle between the vehicle and the trailer.

9. The system of claim 1, further comprising a set of yaw sensors that facilitate estimating Φ, angle between the vehicle and the trailer, and wherein the at least one of the computer-executable components further integrates difference between vehicle and trailer yaw angular rate ($\theta dot_1$ and $\theta dot_2$) over time.

10. A computer implemented method, comprising:

receiving, by a system comprising a processor, electronic signals comprising steering wheel input representing a desired vehicle-trailer hitch angle; and based on the electronic signals, navigating, by the system, the vehicle in reverse mode by generating steering rack commands based on the desired vehicle-trailer hitch angle, wherein navigating the vehicle in reverse mode comprises:

based on a kinematic model having parameters comprises a wheelbase, a length from a tow hook to a rear axle of the vehicle, and a length from the tow hook to an axle on the trailer, estimating, by the system, a hitch angle of a trailer coupled to the vehicle, and an angular rate of the hitch angle using the data gathered during the navigating; and controlling, by the system, using a linearization of the kinematic model, a speed of the vehicle and a steering wheel angle input of the vehicle to maintain the hitch angle within a stable range.

11. The method of claim 10, further comprising:

maintaining, by the system, a zero-torque relationship between the steering angle and hitch angle.

12. The computer implemented method of claim 11, further comprising:

employing, by the system, artificial intelligence that has been implicitly trained to facilitate maintaining the hitch angle within the stable range.

13. The computer implemented method of claim 11, further comprising:

employing, by the system, artificial intelligence that has been explicitly trained to facilitate maintaining the hitch angle within the stable range.

14. The computer implemented method of claim 11, further comprising:

estimating, by the system the steering angle of the vehicle using the following equation:

$$\delta = \frac{\dot{\phi} + \frac{v}{L_3}\cdot\phi}{-\frac{v}{L_1}\cdot\left(1 + \frac{L_2}{L_3}\right)}$$

wherein:

$L_1$ is wheelbase of the vehicle;

$L_2$ is length from a tow hook to rear axle of the vehicle;

$L_3$ is length from the tow hook to axle on the trailer;

V is velocity of the vehicle; and

Φ is angle between the vehicle and the trailer.

15. The computer implemented method of claim 11, further comprising:

maintaining, by the system the hitch angle to below a threshold that can result in jack knifing of the trailer.

16. The computer implemented method of claim 11, further comprising:

estimating, by the system the length of the trailer ($L_3$) using the following equation:

$$L_3 = -\frac{v\cdot(\sin(\phi)\cdot L_1 + L_2\cdot\cos(\phi)\cdot\tan(\delta))}{\dot{\phi}\cdot L_1 + v\cdot\tan(\delta)}.$$

17. The computer implemented method of claim 11, further comprising:

estimating, by the system using a linear transducer to estimate Φ, the angle between the vehicle and the trailer.

18. The computer program product of claim 17, the program instructs are further executable by the processor to cause the processor to:

employ artificial intelligence that has been implicitly trained to facilitate maintaining the hitch angle within the stable range.

19. The computer program product of claim 17, the program instructs are further executable by the processor to cause the processor to:

employ artificial intelligence that has been explicitly trained to facilitate maintaining the hitch angle within the stable range.

20. The computer program product of claim 17, the program instructs are further executable by the processor to cause the processor to:

estimate the steering angle of the vehicle using the following equation:

$$\delta = \frac{\dot{\phi} + \frac{v}{L_3}\cdot\phi}{-\frac{v}{L_1}\cdot\left(1 + \frac{L_2}{L_3}\right)}$$

wherein:

$L_1$ is wheelbase of the vehicle;

$L_2$ is length from a tow hook to rear axle of the vehicle;

$L_3$ is length from the tow hook to axle on the trailer;

V is velocity of the vehicle; and

Φ is angle between the vehicle and the trailer.

21. The computer program product of claim 17, the program instructs are further executable by the processor to cause the processor to:

maintain the hitch angle to below a threshold that can result in jack knifing of the trailer.

22. The computer program product of claim 17, the program instructs are further executable by the processor to cause the processor to:

estimate the length of the trailer ($L_3$) using the following equation:

$$L_3 = -\frac{v\cdot(\sin(\phi)\cdot L_1 + L_2\cdot\cos(\phi)\cdot\tan(\delta))}{\dot{\phi}\cdot L_1 + v\cdot\tan(\delta)}.$$

23. The computer implemented method of claim 11, further comprising:

estimating, by the system, using a set of yaw sensors to facilitate estimating Φ, angle between the vehicle and the trailer, wherein the controller integrates difference between vehicle and trailer yaw angular rate ($\theta dot_1$ and $\theta dot_2$) over time.

24. A computer program product for vehicle maneuvering system, the computer program product comprising a non-transitory computer readable storage medium having program instructions embodied therewith, the program instructions executable by a processor onboard to cause the processor to:

receive electronic signals comprising steering wheel input representing a desired vehicle-trailer hitch angle; and based on the electronic signals, navigate the vehicle in reverse mode by generating steering rack commands based on the desired vehicle-trailer hitch angle, wherein navigating the vehicle in reverse mode comprises:

based on a kinematic model having parameters comprises a wheelbase, a length from a tow hook to a rear axle of the vehicle, and a length from the tow hook to an axle on the trailer, estimating the hitch angle of a trailer coupled to the vehicle, and an angular rate of the hitch angle using the data gathered during the navigating; and controlling, using a linearization of the kinematic model, a the speed of the vehicle and a steering wheel angle input of the vehicle to maintain the hitch angle within a stable range.

* * * * *